US006340971B1

(12) United States Patent
Janse et al.

(10) Patent No.: US 6,340,971 B1
(45) Date of Patent: Jan. 22, 2002

(54) METHOD AND DEVICE FOR KEYFRAME-BASED VIDEO DISPLAYING USING A VIDEO CURSOR FRAME IN A MULTIKEYFRAME SCREEN

(75) Inventors: Magdalena D. Janse; Duco A. D. Das; Hok K. Tang, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/015,878

(22) Filed: Jan. 29, 1998

(30) Foreign Application Priority Data

Feb. 3, 1997 (EP) .............................................. 97200286

(51) Int. Cl.[7] ................................................. G06F 3/00
(52) U.S. Cl. ....................................... 345/327; 345/328
(58) Field of Search .............................. 345/343, 327, 345/328; 348/597, 588, 564; 382/236; 395/339

(56) References Cited

U.S. PATENT DOCUMENTS

| 5,537,530 A | * 7/1996 | Edger et al. | 345/343 |
| 5,884,056 A | * 3/1999 | Steele | 395/339 |
| 5,894,333 A | * 4/1999 | Kanda et al. | 348/597 |
| 6,009,204 A | * 12/1999 | Ahmad | 382/236 |
| 6,118,493 A | * 9/2000 | Duhault et al. | 348/564 |

FOREIGN PATENT DOCUMENTS

| JP | 8-163479 | * 6/1996 | H04N/5/76 |
| WO | WO 99/05865 | * 2/1999 | H04N/5/93 |

OTHER PUBLICATIONS

"Content Oriented Visual Interface Using Video Icons for Visual Database Systems", by Y. Tonomura et al., Journal of Visual Languages and Computing 1990, vol. 1, pp. 183–198.

"Content–Based Video Browsing Tools", by H.J. Zhang et al., SPIE vol. 2417, 1995, pp. 389–398.

"A Multi–Layer Video Browsing System", by H.Y. Chen et al, IEEE Transactions on Consumer Electronics, vol. 41, No. 3, Aug. 1995, pp. 842–850.

"Content–Based Video Indexing and Retrieval", by S.W. Smoliar et al, IEEE Multimedia, 1994, pp. 62–72.

* cited by examiner

Primary Examiner—David E. Harvey
(74) Attorney, Agent, or Firm—Gregory L. Thorne

(57) ABSTRACT

A method and device for keyframe-based video displaying using a video cursor frame in a multikeyframe screen.

Keyframe-based displaying of a video presentation enables a user to select among keyframes, and based on the selecting displays a substantially continuous video stream relating to the presentation. In particular, various keyframes are displayed in parallel in a reduced and static video format, and the displaying is controlled as starting from a particular active key frame which subsequently acts as a dynamic cursor frame within the video format. The cursor may be dynamic video plus dynamic audio, dynamic video alone, or static video per interval plus dynamic audio.

17 Claims, 4 Drawing Sheets

METHOD AND DEVICE FOR KEYFRAME-BASED VIDEO DISPLAYING USING A VIDEO CURSOR FRAME IN A MULTIKEYFRAME SCREEN

BACKGROUND OF THE INVENTION

The invention relates to a method for keyframe-based displaying of a video presentation whilst enabling a user to select among said keyframes, and through such selecting, displaying a substantially continuous video stream based on said presentation, and which method displays various such keyframes in parallel in a reduced and static video format. The use of keyframes as representative parts of a video presentation that is recorded for subsequent selective playback has been proposed elsewhere. A continuous video stream means that video remains "on", which may include animation, a series of stills, or an interactive sequence of images. The character may be various, such as film, news, or for example a shopping list. State of the art is represented by the article 'Content-Based Video Indexing and Retrieval' by S. W. Smoliar and H. J. Zhang, IEEE Multimedia, Summer 1994, pages 62–72.

By themselves, keyframes may be derived from the video material upon its reception at the user's premises through some derivation algorithm, or keyframes may be labelled as such by the video provider, for example, in that each new video shot will start with a keyframe. The present invention recognizes that such keyframes should be utilized so as to give users a dynamic overview over the presentation, combined with useful facilities for enabling them to edit the material in a sensible manner.

SUMMARY TO THE INVENTION

Therefore, amongst other things it is an object of the present invention to provide a user with an immediate feel of the dynamic aspects, as well as of the static content of the video presentation, as combined in a single video screen. Now, according to one of its aspects, the invention is characterized in that said displaying is controlled as starting from a particular active keyframe which subsequently to the selecting acts as a dynamic video cursor frame within said format. In this embodiment, the cursor frame moves in real time, thereby enabling users to discern between keyframes, that may have similar scene configurations but different dynamisms.

Advantageously, the method allows for rendering an audio-accompanied video presentation, whilst said rendering is controlled as starting from audio associated to a particular active keyframe that subsequently to the selecting acts as a discrete video cursor frame within said format. In certain presentations, for proper editing the audio is more discriminative than the video, and so the audio could represent the ongoing stream, while the video keyframe would operate as a kind of "header" pertaining to the interval between the two successive keyframes in question. The video keyframe may remain static, while the active keyframe that works as discrete or discretely stepping cursor frame may be highlighted in an appropriate manner.

Advantageously, said dynamic video cursor frame freezes upon coinciding with the next displayed keyframe's content. The freezed display content may pertain either to the start, or to the end of the interval that has just been displayed. Subsequently, the next keyframe may become the a dynamic video cursor frame. The taking over may be controllable and/or programmable: this allows a user to view what editing the presentation will produce. Also, upon going to a next interval, the display mode may be altered, such as from normal to fast or slow display. The invention may be used for fully digital video, or rather for video in which the various video frames have digital labels for easy addressing.

Advantageously, the keyframes are set in a hierarchical structure and/or various keyframes are allowed to be deleted from display for so joining intervals of said presentation before and behind the deleted keyframe. In this way, fine-grained as well as coarse-grained editing can be applied in quick alternation. Again, the hierarchical structure may be implemented through the provider, or rather through some clustering algorithm. For example, if keyframes will be found through some cross-correlation, a rather small discrepancy therein may signal a low level keyframe, whereas a high discrepancy may signal a high level keyframe. The first could occur between successive shots in essentially the same movie scene, whereas the second would pertain to a changeover between scenes, that also may change overall conditions such as lighting level dramatically. Another situation is when various different types of video matter follow each other, such as news, film, or a service shop list. All this may facilitate the operations of the end user.

The invention also relates to a device for keyframe-based displaying of a video presentation and having selection means for enabling a user to select among said keyframes, and based on such selecting rendering a substantially continuous sensory stream relating to said presentation, said display device being arranged for displaying various such keyframes in parallel in a reduced and static video format, characterized in that the device has control means for controlling said rendering as starting from a particular active keyframe which subsequently acts as a video cursor frame within said format. The providing of the recited facilities in the environment of a user terminal, such as an enhanced video recorder plus TV set combination is believed to greatly extend user-directed performance thereof. Further advantageous aspects of the invention are recited in dependent claims.

BRIEF DESCRIPTION OF THE DRAWING

These and other aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Various advantageous aspects, in particular, but not exclusively pertaining to a standard ordinary customer and private home use, imply the following:

The keyframes must be presented in such a manner that they are generally distinguishable from each other by a user person located at a typical TV viewing distance, as related to the video size in question. For a family set, this distance amounts to a few meters, for a desktop set to about one half of a meter, and so on.

The number of keyframes presented simultaneously on one screen should be sufficient for providing a user person with an overview of a significant part of the contents of the digital video material.

The keyframes should be displayed in a generally undistorted fashion for maximizing discernability. For example, the aspect ratio of a particular key frame should preferably be retained.

Preferably, the remote control device of the TV set itself operates as the user control input device.

Feedback must be such that the information associated to the feedback is perceivable from a typical viewing distance of an ordinary television set, as discussed supra.

Computer concepts such as "drag and drop" are generally not necessary.

Occasional usage of the facilities must be provided for.

It must be provided for, that the facilities may be used only occasionally, rather than continually.

Concepts in the user interface should reflect the linear model of the video presentation that is familiar to users.

DISCLOSURE OF A PARTICULAR EMBODIMENT

Figure 1:
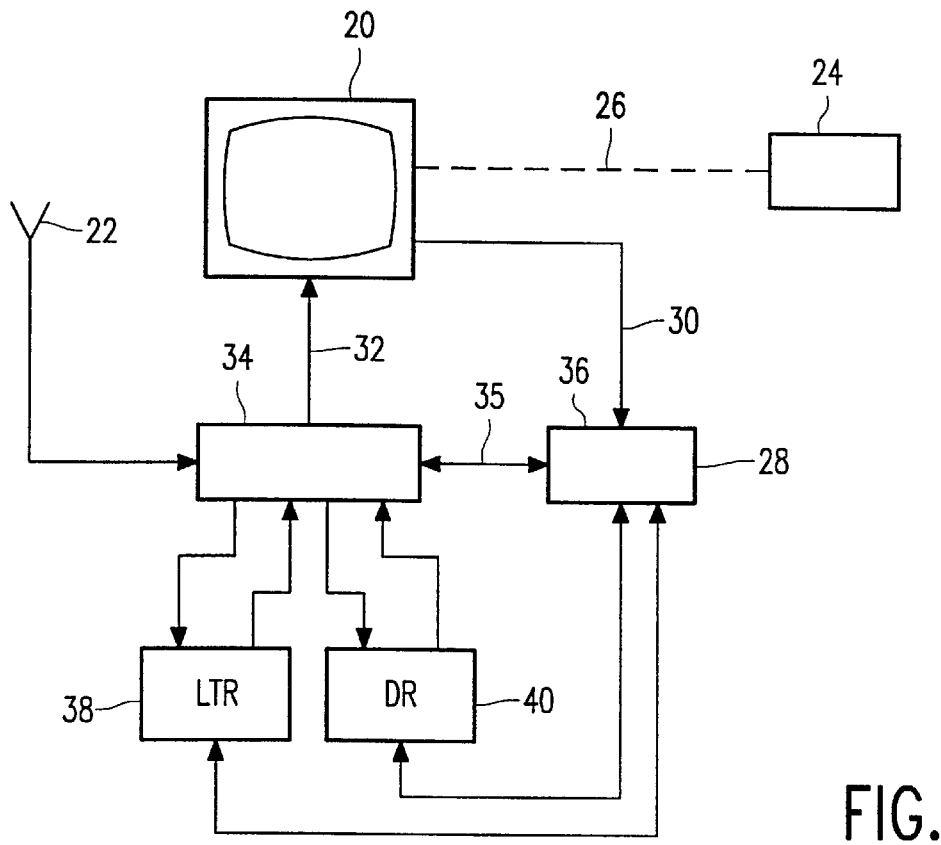
FIG. 1, a block diagram of a TV-Recorder combination.

Regarding to an implementation of the invention, FIG. 1 is a diagram showing a TV-Recorder combination. Item 20 represents the TV-set display and associated immediate control and powering. Item 22 represents the antenna, or the connection with another type of signal distribution entity, such as cable distribution. This item includes, if appropriate, also the derivation of the digital video information or the digital signal part from the received signal. Item 34 represents the routing of the video streams and associated information between the various subsystems of FIG. 1. This routing is governed by control box 34 through control signals on line 35. The latter has been drawn as a single bidirectional interconnection but may in fact be built from any number of unidirectional or bidirectional lines. The control box receives detection signals from the display, and from further subsystems 38, 40, whilst also controlling the latter two. Now, block 38 is a linear tape recorder with a very high storage capacity in the multi-gigabyte region. Block 40 is a magnetic disc recorder with a high storage capacity, but which is nevertheless only a fraction of that of recorder 38; on the other hand, access in recorder 40 is much faster through crosstrack jumping. Together, blocks 28, 40 form a two-level storage organization that is somewhat akin to a computer memory cache system, and stores all items of a video presentation at least once.

Figure 2:
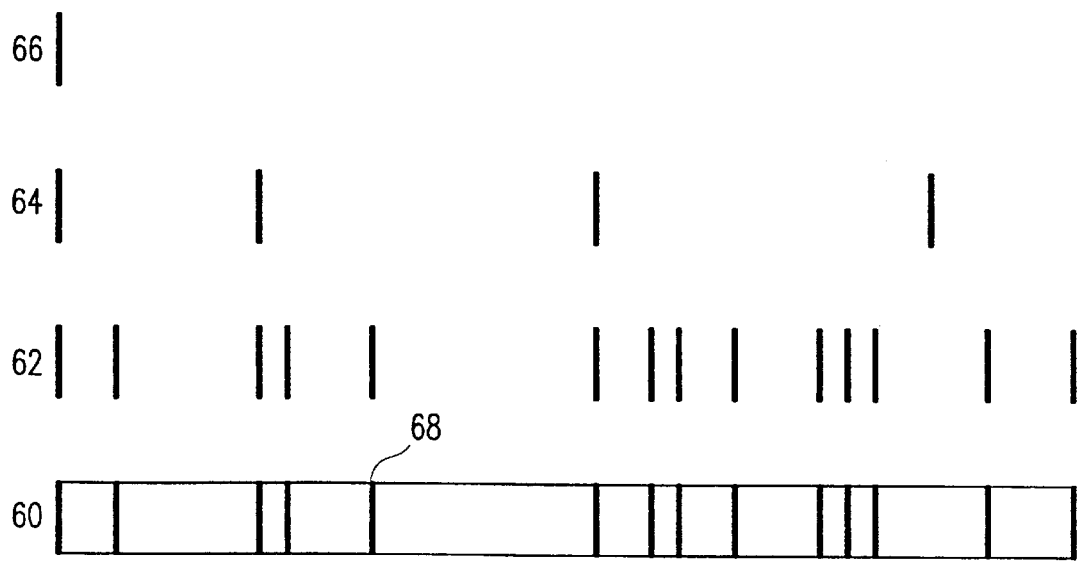
FIG. 2, an exemplary structure of a video recording.

FIG. 2 shows an exemplary structure of a video presentation. For effecting the video matter functionality, bar 60 contains the video itself, either in the form of frames, or as a string of compressed video matter, such as MPEG-coded. The information is stored along the bar as video time progresses, although actual storage requirements need not be uniform over time. Interspersed keyframes have been indicated by dark vertical stripes such as 68. A keyframe is used as representing, or as being typical of the overall video in the interval up to the next key frame. One realization is that the video provider singles out the first frame of each new shot as the keyframe thereof through adding some label or inclusion in a "table of contents" (TOC). Another realization is that the receiver, through some algorithm, detects that the video content changes abruptly from one frame to the next. The present invention takes the associated algorithms for granted. As shown, their distribution may be non-uniform. An alternative mechanism is that successive keyframes succeed each other at prescribed intervals, such as every ten seconds. According to the embodiment, at indication 62 only the keyframes are represented. Furthermore, the keyframes are organized in some hierarchy, in that indication 64 has only a limited set of highly relevant keyframes. This hierarchization may be repeated, in that indication 66 is associated with only a single keyframe for all of the video presentation 60. The various levels of keyframes may be determined in different ones of the organizations recited supra, and may even exist side by side. The storage mapping on FIG. 1 may be effected in that the main body of the video presentation is stored in tape recorder 38, whereas the keyframes are at least reproduced in disc recorder 40, possibly in combination with small video intervals immediately following the associated keyframe. The length of such interval may correspond to the time latency of linear tape recorder 38, so that thereby real-time access may be attained. By itself, the video presentation may be essentially linear, such as a film. Alternative usage is that certain storage intervals may contain animation, stills, or other images to be used by a consumer present. A possible influencing of a keyframe is to suppress it. This effectively joins the time interval before the keyframe in question with the time interval behind it. A reset feature may again disjoin the interval. Also, various classes of keyframes may be suppressed, such as the class that is separated from each other by a fixed time interval. Various different classes of keyframes could be available for one presentation, such as those introduced by the provider versus those that are generated by a local algorithm at reception.

Figure 3:
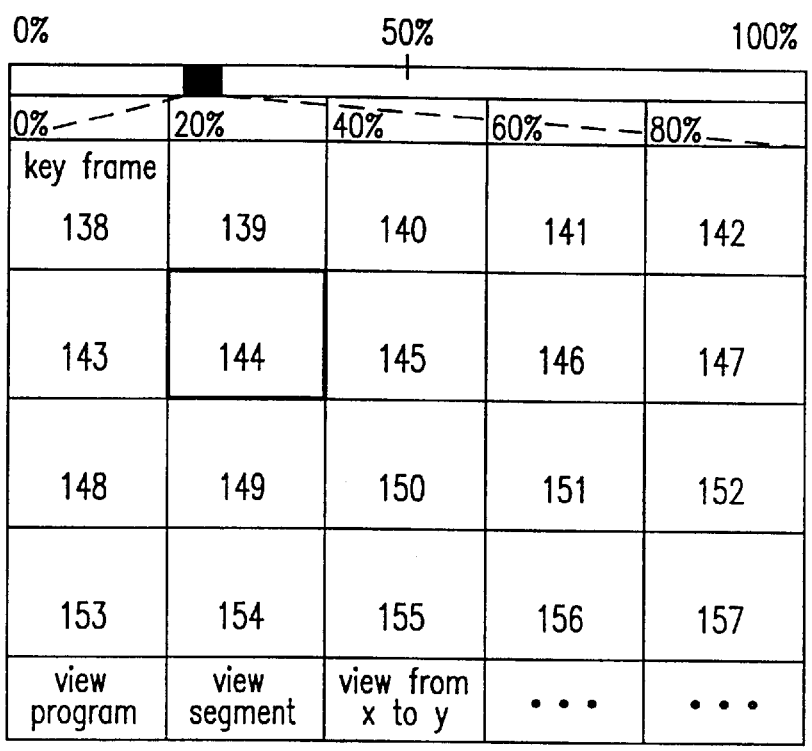
FIG. 3, a design of a scrolling mosaic user interface.

FIG. 3 is an exemplary design of a scrolling mosaic user interface. Every screen presents twenty keyframes starting from the top left corner from left to right down to the bottom right corner: each keyframe has its number in the overall ranking of keyframes shown. Actually, keyframe 144 is highlighted by a rectangular control cursor. A user person may through activating a remote control, move the control cursor freely over the keyframes displayed, as well as over the buttons displayed at the top and bottom bars, through the navigational controls on the cursor device. If the user moves the control cursor to the left in the top left corner, the display jumps back by 20 keyframes. Moving to the right in the lower right hand corner will cause a forward jump over 20 frames. Further, accessing the top bar of the overall screen will effect shortcut controls for accessing other parts of the presentation, in that the latter is divided into five equally long parts: a black horizontal bar indicates the total time covered by the twenty keyframes displayed here, of the overall presentation.

Other functions may be initiated by first selecting a particular keyframe and subsequently one of the bottom buttons. "View program" may control a start at a cursor-accessed keyframe. "View segment" may do the same, but may be restricted to playing only a single segment, that will end at the next keyframe. "View from x to y" may control a start at the earliest in time of two cursor-accessed keyframes, and stop at the last in time of the two cursor-accessed keyframes. Various other control modes or functions are feasible in combination with the keyframe-selecting functionalities described supra. Examples are fast-forward or slow-forward, that allow a user person to check a particular interval for certain occurrences, or reverse to attain certain video effects. During the display, upon passing the instant in time pertaining to a particular keyframe, the latter becomes active and effectively displays the video stream, until arriving at the instant associated with the next keyframe. Thereupon, the latter becomes the active frame.

The above feature allows a user to straightforwardly program a video recorder for an interval display sequence such as by leaving out certain segments, such as advertising, or rather, to draw attention to certain details by means of slow-forward. During the display, audio may be active or suppressed through a control button not shown. Alternatively, control may let audio go on, but the video cursor is discrete, in that it steps only from interval to interval though appropriate highlighting.

Figure 4:
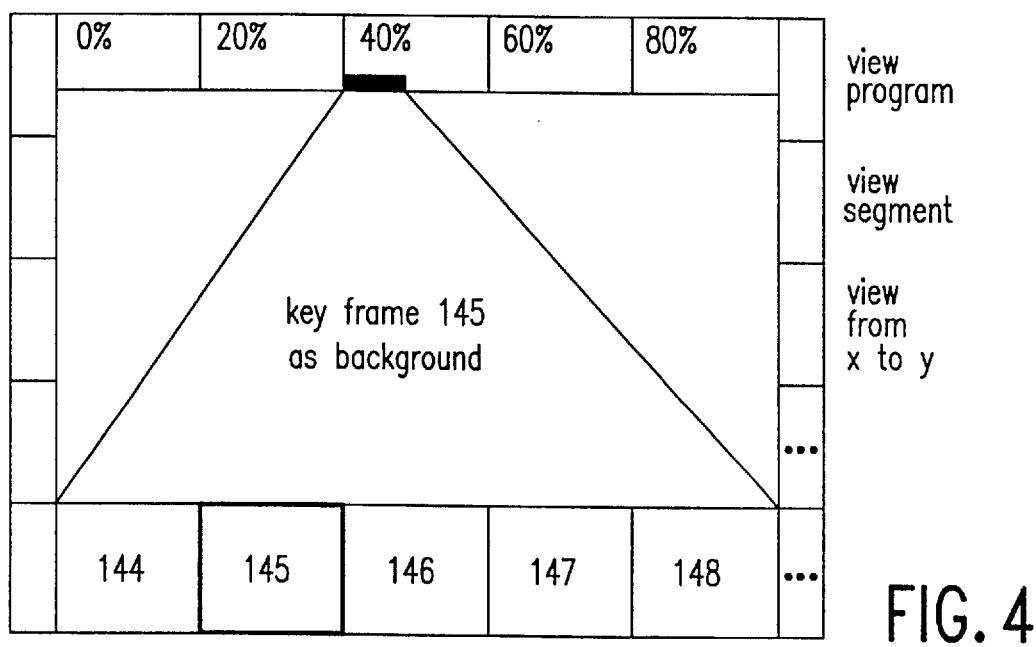
FIG. 4, a design of a scrolling list user interface.

FIG. 4 shows an exemplary design of a scrolling list user interface. Here, at the bottom of the overall screen five keyframes are displayed, keyframe 145 being highlighted by a rectangular control cursor that runs along the edges of the keyframe. Keyframe 145 is also displayed at a larger magnification in the background. The control interface is the same as with respect to FIG. 3, although the control button positions are different. Alternatively, the enlarged keyframe is suppressed in the multi-keyframe bar.

Figure 5:
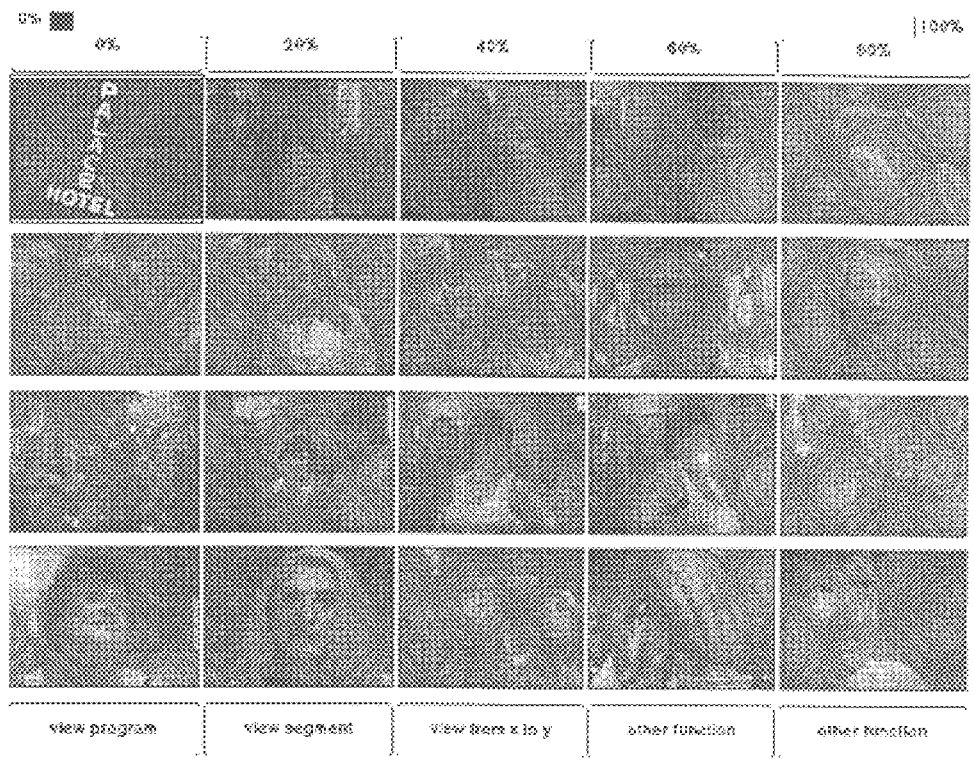
FIG. 5, a realisation of FIG. 3.

FIG. 5 shows a realisation of FIG. 3, with actual images representing the keyframes, and with a few modifications. The control interface is identical with the one discussed earlier, although a few items have been left out that were considered aesthetically unattractive. In the embodiment, the time stretch covered by the 20 keyframes amounted to about 2 minutes, which appears to be close to a useful lower bound. The various keyframes can indeed quite well be distinguished from each other. Further modifications may include leaving out various ones of the control buttons, when it is felt that user persons will not feel the need for extensive editing.

The rationale of the arrangements for having a dynamic representation of the video cursor that runs in time in the actually active keyframe field, is that the static representation of the keyframes alone does insufficiently convey the semantics of the video representation as a whole, when such dynamics are indispensible for 'understanding' the evolvement of the events. Therefore, the semantics are enhanced as follows. After the system has been idle for a certain amount of time, the keyframe that the cursor 'encloses' Will 'come alive' as it will start playing the digital video material in miniature, including any associated audio and further effects. If during the playback, the next keyframe is reached, the cursor will automatically 'jump' to the next keyframe presented in the user interface, until the user will (re)start interacting with the system.

Figure 7:
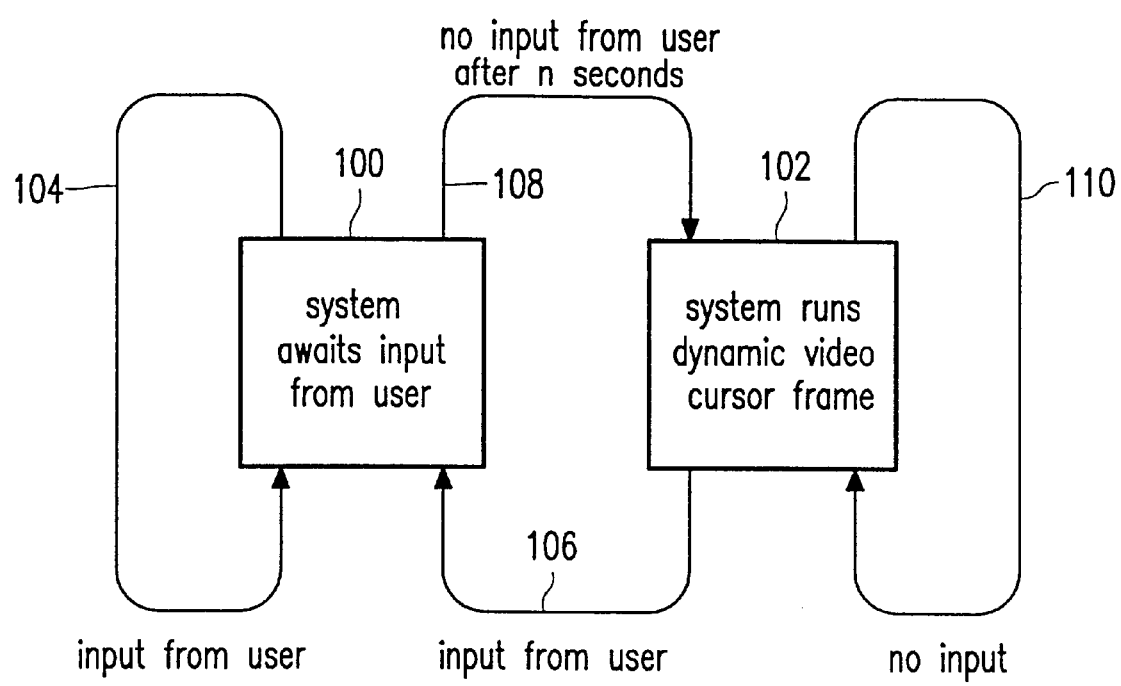
FIG. 7, a state diagram of the system operation.

In this respect, FIG. 7 is a state diagram of the system operation. In state 100, the system awaits input from the user, while displaying the multiple keyframes. Such input may imply jumping among the displayed keyframes, jumping to another set of keyframes, selecting a keyframe for displaying the associated interval. Any such input effects arrow 104 and starts a new time interval. Absent any such input during n seconds (such as 20 seconds) effects arrow 108, so that state 102 is reached. Therein, the system runs the dynamic video cursor frame. As long as no user input is received, arrow 110 is effected, and the system continues as long as displayable video material is available. If user input is received however, arrow 106 is effected, and the system freezes, either at the actual content of the dynamic video cursor frame, or at the beginning of the actual interval.

Figure 6:
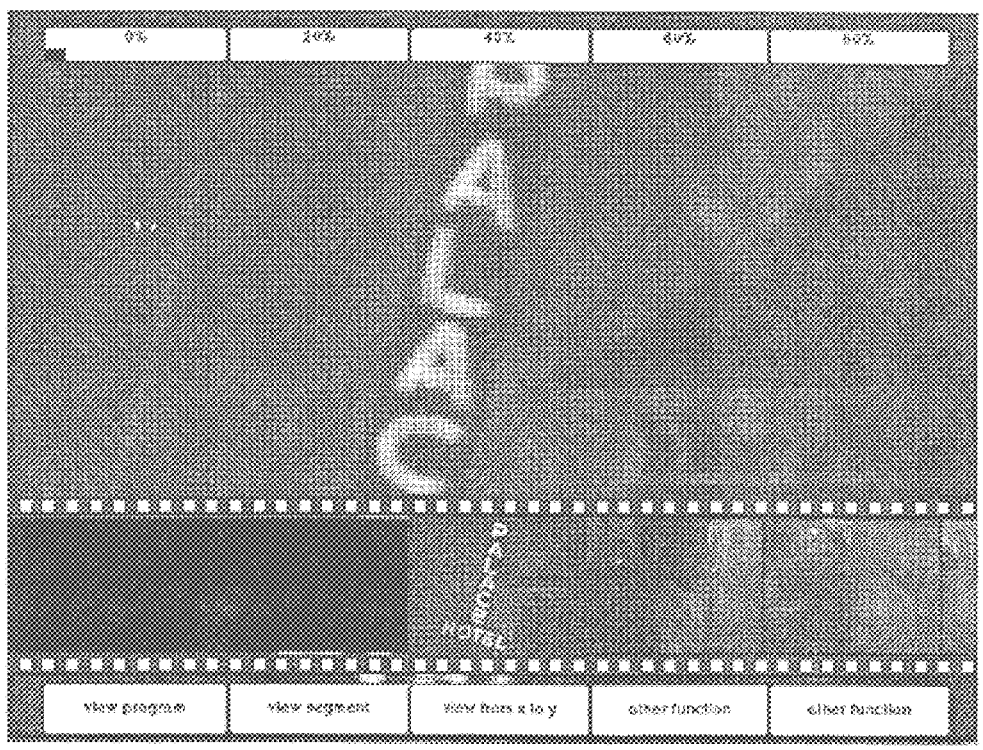
FIG. 6, a realisation of FIG. 4.

FIG. 6 is a realisation of FIG. 4. It displays a screen capture of the actual implementation. Here the lines diverging from the top bar of the screen have not been implemented for reasons of a aesthetics. Moreover, the cursor position remains fixed in the centre of the screen, thereby operating as a focal point on a big real of film snap shots. These small changes aside, the user interface functions as described hereabove.

What is claimed is:

1. A method for keyframe-based displaying of a video presentation comprising:

displaying various keyframes in parallel in a reduced and static video format selecting among said keyframes to generate a presentation, controlling the presentation as starting from a particular active keyframe which subsequently to the selecting step acts as a dynamic video cursor frame within said format, and displaying a substantially continuous video stream based on said presentation.

2. A method as claimed in claim 1, wherein said video is audio-accompanied, and the method allows suppressing of the audio associated to the actual dynamic video cursor frame.

3. A method for keyframe-based rendering of an audio-accompanied video presentation comprising:

displaying various keyframes in parallel in a reduced and static video format, selecting among said keyframes to generate a presentation, controlling said rendering as starting from audio associated to a particular active keyframe that subsequently to the selecting acts as a discrete video cursor frame within said format, and outputting a substantially continuous sensory stream based on said presentation.

4. A method as claimed in claim 1, wherein said dynamic video cursor frame freezes upon coinciding with the next displayed keyframe's content.

5. A method as claimed in claim 4, wherein upon said coinciding, a next keyframe takes over as dynamic video cursor.

6. A method as claimed in claim 5, wherein said taking over is controllable and/or programmable.

7. A method as claimed in claim 5, wherein said taking over may involve a programmable mode altering.

8. A method as claimed in claim 1, wherein said displayed keyframes substantially take up an entire an actual video format.

9. A method as claimed in claim 1, wherein said displayed keyframes take up a fraction of an actual video format, and said dynamic video cursor frame is displayed in an enlarged format with respect to other keyframes.

10. A method as claimed in claim 1, which furthermore displays a predetermined set of soft control keys.

11. A method as claimed in claim 1, wherein said video presentation is at least digitally labeled.

12. A method as claimed in claim 1, wherein keyframes are set in a hierarchical structure and/or various keyframes are allowed to be deleted from display for so joining intervals of said presentation before and behind the deleted keyframe.

13. A device for keyframe-based displaying of a video presentation comprising:

a selection means for enabling a user to select among said keyframes, a display device for displaying a substantially continuous sensory stream relating to said presentation, said display device being arranged for displaying various such keyframes in parallel in a reduced and static video format, and a control means for controlling the display device as starting from a particular active keyframe which subsequently acts as a video cursor frame within said format.

14. A device as claimed in claim 13, wherein the control means includes a continuous video function and said video cursor frame is dynamic.

15. A device as claimed in claim 14, wherein the control means includes an audio component, and said video cursor frame is a discrete video cursor frame.

16. A device as claimed in claim 13 and arranged for displaying said keyframes at mutually uniform sizes.

17. A device as claimed in claim 13 and arranged for displaying a video cursor frame in an enlarged size with respect to a plurality of further keyframes in a uniform said reduced format.

* * * * *